US006625805B1

(12) United States Patent
Lam et al.

(10) Patent No.: US 6,625,805 B1
(45) Date of Patent: Sep. 23, 2003

(54) DYNAMIC BYTE CODE EXAMINATION TO DETECT WHETHER A GUI COMPONENT HANDLES MOUSE EVENTS

(75) Inventors: Ioi K. Lam, Mountain View, CA (US); Kuldipsingh Pabla, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/327,919

(22) Filed: Jun. 8, 1999

(51) Int. Cl.[7] .................................................. G06F 9/44
(52) U.S. Cl. ...................... 717/130; 717/126; 717/127; 717/118; 345/156
(58) Field of Search ...................... 714/28, 44; 717/146, 717/147, 148; 345/746, 744, 156–163; 709/310–332

(56) References Cited

U.S. PATENT DOCUMENTS

| | | | | |
|---|---|---|---|---|
| 5,201,050 A | * | 4/1993 | McKeeman et al. | 717/111 |
| 5,265,254 A | * | 11/1993 | Blasciak et al. | 717/130 |
| 5,579,511 A | * | 11/1996 | Cavasa et al. | 703/27 |
| 5,745,909 A | * | 4/1998 | Perlman et al. | 345/428 |
| 5,880,740 A | * | 3/1999 | Halliday et al. | 345/629 |
| 6,026,237 A | * | 2/2000 | Berry et al. | 717/130 |
| 6,226,665 B1 | * | 5/2001 | Deo et al. | 709/102 |
| 6,305,012 B1 | * | 10/2001 | Beadle et al. | 717/148 |
| 6,324,688 B1 | * | 11/2001 | Brown et al. | 717/148 |
| 6,469,694 B1 | * | 10/2002 | Mikan | 345/168 |

OTHER PUBLICATIONS

"Web Content Accessibility Guidelines", W3C Working Draft, Mar. 16, 1999.*

* cited by examiner

*Primary Examiner*—Tuan Q. Dam
*Assistant Examiner*—William Wood
(74) *Attorney, Agent, or Firm*—Beyer, Weaver & Thomas, LLP.

(57) ABSTRACT

Broadly speaking, the present invention provides apparatus and methods for determining whether a byte code formatted computer program handles pointer device events. It is determined whether the computer program includes byte codes that process a pointer device event, and a tag is associated with the examined byte code that has been determined to process a pointer device event. In still another embodiment, the invention pertains to a computer-implemented method for examining a computer program having byte codes. The computer program may contain code for displaying a graphical user interface (GUI) component on a display device. The byte codes of the GUI component are examined to determine whether the GUI component is associated with a pointer device event. If it is determined that the GUI component is associated with a pointer device event, a tag is associated with the GUI component. The tag indicates that the GUI component responds to pointer device events. The GUI component is eventually displayed on the display device.

43 Claims, 10 Drawing Sheets

DYNAMIC BYTE CODE EXAMINATION TO DETECT WHETHER A GUI COMPONENT HANDLES MOUSE EVENTS

BACKGROUND OF THE INVENTION

1. Field of Invention

The present invention relates generally to software applications and, more particularly, to methods and apparatus for optimizing the execution of software applications having a byte code format.

2. Description of Related Art

The use of computer systems which share resources across a network of computer systems, e.g., local area networks, intranets and the internet, is increasing. Accordingly, software applications, or computer programs, may be delivered in different formats to different computer systems, due to the fact that a particular computer system generally requires software applications to be in a format that is specific to that particular computer system. Alternatively, the computer programs may be delivered to a computer system in a machine-independent form, i.e., as byte codes, in order to enable one form of a computer program to be utilized by many different computer systems.

Computer systems which receive byte codes generally include compilers which are used to compile byte codes at run-time. Compiling byte codes at run-time entails translating the byte codes into machine code. FIG. 1 is a block diagram representation of a computer system with a byte code compiler. Byte codes 104, which may be arranged as a computer program, are delivered, or otherwise provided, to a computer system 105.

Byte codes 104 may generally be provided by a variety of different sources. For example, byte codes 104 may be within downloadable applets that are associated and executed with a particular web page. When byte codes 104, are executed, byte codes 104 are compiled using a compiler 106 at run-time. Compiled code 108, which is produced by compiler 106, is generally machine-dependent code that is specific to, and may be executed within, computer system 105. That is, compiler 106 translates byte codes 104 into compiled code 108 at run-time.

The byte codes may generate graphical user interface (GUI) components, which allow the user to interact through a mouse input device, for example. Although these GUI components function adequately within systems that include mouse input devices, they may function improperly within systems that do not include mouse input devices. For example, a television system that provides access to the world wide web is not likely to include a mouse device.

FIG. 2 represents a television system 200 that may be used to access the world wide web. Typically, a set top box 203 provides an interface between a televisions set 205 and network signals 204. The set top box 203 also typically receives input from a remote device 207 (e.g., a remote keyboard 207a or a remote control 207b) for selecting a web location. The set top box 203 then contacts the selected web location and displays the content from the selected web location on the television screen 205.

If the web page has embedded applets, the set top box 203 will download the applets on the television 205. Applets are generally in the form of computer programs that are downloaded from a remote server and executed by the local client (e.g., the set top box 203). Some applets are designed for mouse interaction. For example, a particular region within the applet may require mouse input, whereas other regions within the applet may not require mouse input. Applets that require mouse input thus present certain difficulties when they are downloaded into a mouseless system. As such, a mouse based applet will likely not function properly within the above described web television system 200.

Therefore, what is needed is a method for dynamically determining whether a particular computer program contains mechanisms for handling mouse events, to thereby ensure reliable mouse event handling for the computer program.

SUMMARY OF THE INVENTION

Broadly speaking, the present invention provides apparatus and methods for determining whether a byte code formatted computer program handles pointer device events. The invention is useful for systems that access and execute byte code formatted programs but do not include a pointer device, such as a mouse device. When it is determined that a particular computer program handles pointer device events, the systems without pointer devices are able to simulate mouse events (e.g., through the arrow keys of a keyboard or remote control) for the particular computer program.

In one embodiment, the invention pertains to a computer readable medium containing computer codes for examining byte codes. The computer readable medium includes computer code for examining a byte code to determine whether the byte code is arranged to process a pointer device event, and computer code that associates a tag with the examined byte code if it is determined that the examined byte code is arranged to process a pointer device event. In one implementation, the byte codes that handle pointer device events may include code that represents a position of a pointer device or code that compares an event identifier to a pointer device event.

In an alternative embodiment the invention pertains to a computer readable medium that includes computer code computer code for examining a plurality of byte codes of a GUI component to determine whether the GUI component is associated with a pointer device event, and computer code for associating with the GUI component a tag that indicates that the GUI component responds to pointer device events if it is determined that the GUI component is associated with a pointer device event.

In one implementation, the byte codes of the GUI components are examined by examining one or more class files associated with the GUI component. In another implementation, the byte codes of the GUI component are examined for handling event code that processes pointer device events. The handling event code is, for example, arranged to compare a value of an event identifier to a representation of a known value of a pointer device event.

In still another embodiment, the invention pertains to a method for examining byte codes. A byte code is examined to determine whether the byte code is arranged to process a pointer device event. If it is determined that the examined byte code is arranged to process a pointer device event, a tag is associated with the examined byte code.

In another embodiment, the invention pertains to a method for examining a computer program having byte codes. A plurality of byte codes of a GUI component are examined to determine whether the GUI component is associated with a pointer device event. If it is determined that the GUI component is associated with a pointer device event, a tag is associated with the GUI component. The tag indicates that the GUI component responds to pointer device events.

In yet another embodiment, the invention pertains to an interactive television system arranged to receive computer programs. The interactive television system includes a processing unit arranged to receive a computer program having a plurality of byte codes for creating a graphical user interface (GUI) component, to examine the byte codes of the received computer program to determine whether a selected one of the byte codes is arranged to process a pointer device event, and to associate a tag with the selected byte code if the selected byte code is arranged to process a pointer device event; an input device arranged to transmit input events to the processing unit; and a display device arranged to display the GUI component created by the computer program.

These and other aspects and advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Reference will now be made in detail to specific embodiments of the invention. While the invention will be described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, the present invention provides techniques for determining whether a particular set of byte code handles pointer device events, such as mouse device events. These techniques may be usefully implemented within a system that accesses and executes byte code formatted programs but does not include a pointer device. For example, the system may be in the form of an interactive television system that provides web access for a user that interacts with the television system via a remote control device. Although the present invention is described with reference to a television system (e.g., FIG. 3), the present invention may be implemented within any suitable system that similarly lack pointer device handling. By way of further examples, the present invention may be implemented within an automobile's navigational system or a handheld personal computer.

Figure 1:
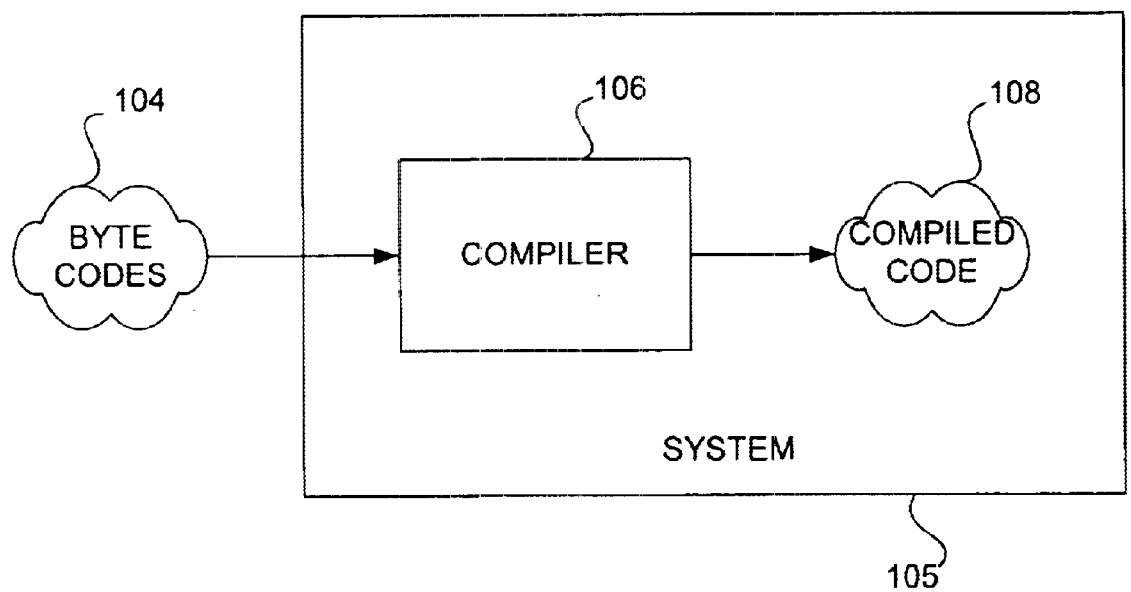
FIG. 1 is a block diagram representation of a computer system with a byte code compiler.
Figure 2:
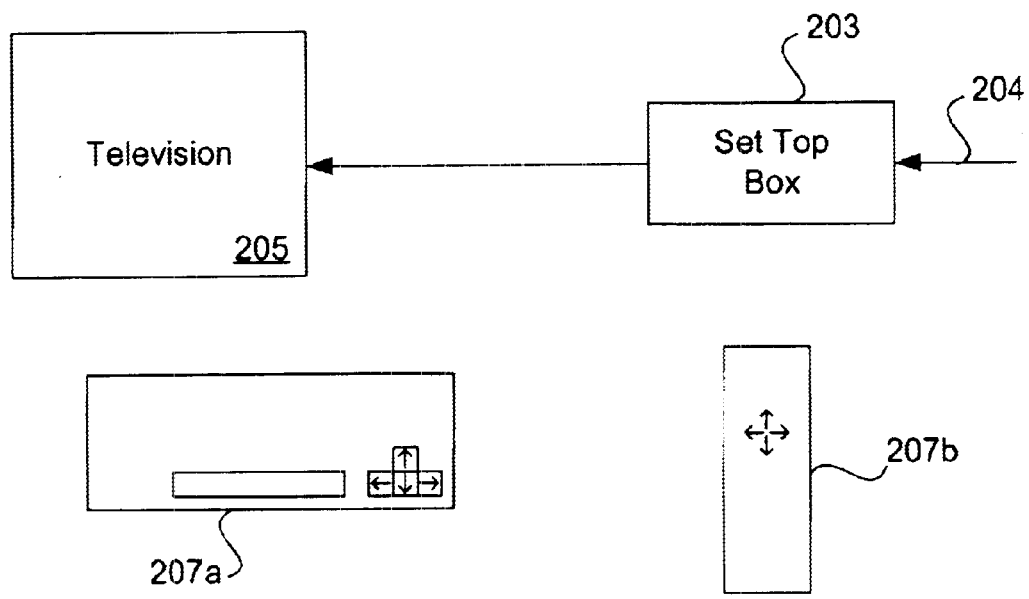
FIG. 2 represents a television system that may be used to access the world wide web.
Figure 3:
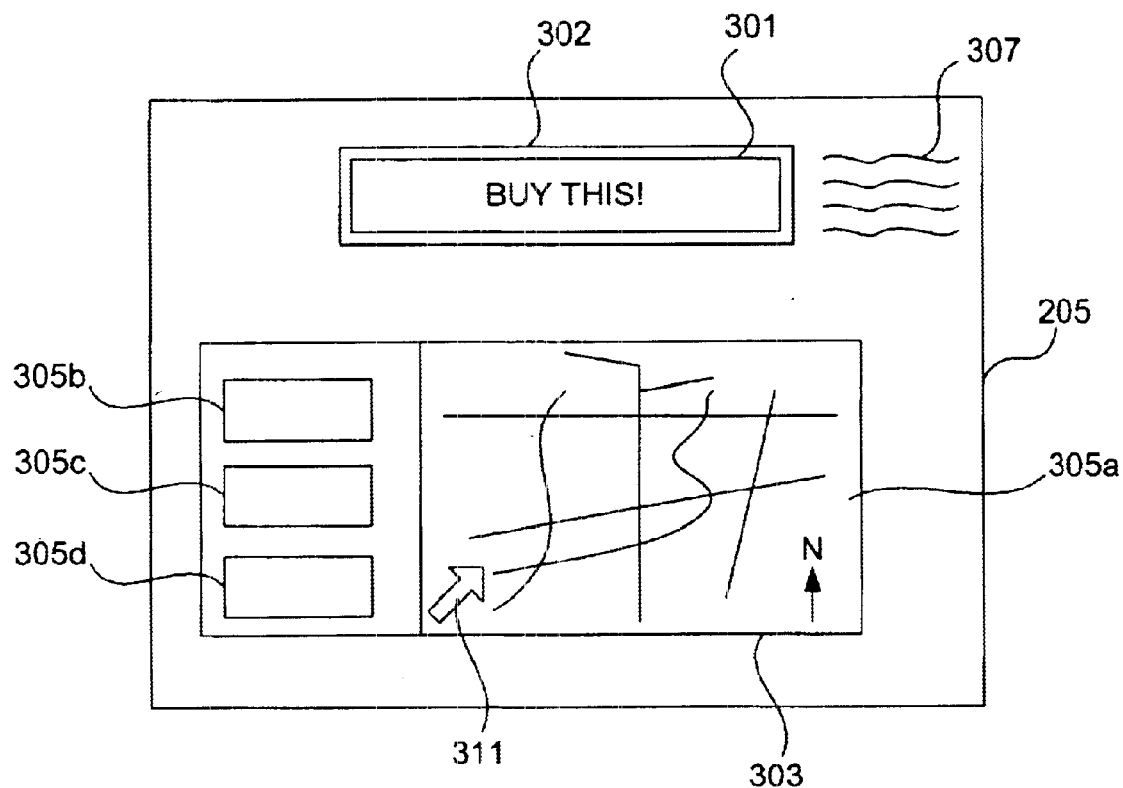
FIG. 3 represents a television display of a television system (e.g., television system of FIG. 2) that is currently accessing a web location.

FIG. 3 represents a television display 205 of a television system (e.g., television system 200 of FIG. 2) that is currently accessing a web location. The web location is associated with a number of displayable or executable objects that together form part of the web location's contents. As shown, executable objects 301, 303, and 307 are displayed on television screen 205.

The executable objects may take any suitable form for executing an audiovisual program. For example, the executable objects may take the form of "applet" programs that are downloaded to the user's local computer system. Applet programs are currently available for a number of tasks. Some applet programs simply display an animated video clip. In other words, some applet programs merely run when their associated web location is accessed. Other applet programs provide executable objects that are interactive, e.g., buttons, pull-down lists, and text entry boxes.

Applet programs are typically selectable via an appropriate input device. When such an applet is selected, the applet is activated. Activation takes many forms. For example, in response to selection, the applet may display a particular web location's contents in place of the currently displayed web location's contents. An applet may also include one or more executable objects (e.g., buttons) that may also be selected and activated.

Executable objects may take the form of any suitable visual or auditory executable object. In the example of FIG. 3, the executable objects are in the form of a text object 307 and two graphical user interface (GUI) components 301 and 303. GUI components may be interactive. That is, GUI components may be selected and activated via some form of input device. For example, GUI components may be selectable with particular keys of the a keyboard, such as the arrow and tab keys, and/or with a pointer device. A pointer device includes any suitable device for selecting particular regions of a GUI component. By way of examples, the pointer device may be in the form of a mouse, trackball, track pad, or stylus device.

GUI components may also be configured to handle mouse input (or other types of pointer device input) within the GUI component itself, as opposed to merely allowing selection of the entire GUI component with the mouse. For example, a GUI component may have a number of subregions that are selectable by moving a mouse over a particular region and pressing a mouse button.

In contrast, GUI components that do not handle mouse input do not have mouse selectable subregions. Non-mouse type GUI components are generally selected by hitting the arrow button or tab button of a keyboard or remote control device or by moving a mouse device over any region of the GUI component and hitting the mouse button. When a non-mouse type GUI component is selected by an arrow key or by moving a mouse over the GUI components, it is highlighted to indicate selection. As shown, a GUI component 301 is highlighted by an outline border 302. The user may then execute the selected GUI components by pressing the enter button of the keyboard or the mouse button. The non-mouse type GUI components may be executed in any number of ways. For example, another web location may be accessed and displayed on the television 205. By way of another example, an animated movie clip may appear and be displayed in place of GUI component 301. By way of final example, the GUI component may be in the form of an "accept" button that may be selected by the user to accept the terms of a displayed contract.

Each GUI component may also include one or more sub GUI components. As shown, GUI component 303 includes sub GUI components 305a through 305d. Each sub GUI component may also be in the form of a non-mouse type GUI component. For example, GUI component 303 includes three non-mouse type GUI components 305b, 305c, and 305d that access three different web location when selected.

A GUI component may itself be in the form of a mouse type GUI component or contain mouse type sub GUI components. A mouse type GUI component, as well as a mouse type sub GUI component, generally allows the user to access different areas of the GUI component by moving a mouse over a particular area of the GUI component and selecting the particular area. In other words, the mouse type GUI component allows selection of different regions within the GUI component. All or some of the regions of a mouse type GUI component may be mouse selectable or "active," while other regions of the mouse type GUI component may be "inactive" with respect to accepting mouse input.

As shown, the GUI component 303 includes a mouse type sub GUI component 305a. The illustrated mouse type component 305a is in the form of a map, for example, of a city. When a user moves a mouse device over a particular region of the map 305a and selects that region, a new image is displayed corresponding to that selected region of the map 305a. For example, an enlarged view of the selected region of the map may then be displayed in place of map 305a.

In the context of a television system, it is desirable to simulate mouse input for mouse type GUI components since television systems typically do not include a mouse input device. For example, moving an "arrow" key of a keyboard or remote control device may simulate moving a mouse device to a particular region of a mouse type GUI component. Additionally, pressing an "enter" key may simulate selecting the particular region of the GUI component with a mouse button.

Although the mouse may be moved to any portion of a display area within a desktop computer system, for example, this may not be practical within a mouseless system, such as a television system. Put in another way, a user probably does not wish to click an arrow button 512 times to traverse the full width of the television display, scan line by scan line. In other words, it is not desirable to have each arrow button selection correspond to one or more scan lines or pixels of the television display.

Accordingly, it is more efficient to have each arrow key selection correspond to a next selectable GUI component or next selectable sub-GUI component when the current GUI component does not handle mouse input. Alternatively, for a mouse type GUI component, each arrow key selection may correspond to a next selectable region of the mouse type GUI component. In other words, it is desirable to have a non mouse mode for moving from non mouse type GUI component to another GUI component, and a mouse mode for moving within a mouse type GUI component.

For the displayed GUI component of FIG. 3, a first down arrow selection corresponds to a selection of GUI component 301. That is, after the down arrow is hit, non mouse mode is activated and GUI component 301 is selected. In non-mouse mode, a second down arrow selection then selects GUI component 303. Third, fourth, and fifth down arrow select sub-GUI components 305b, 305c, and 305d, respectively. Activation of GUI components of a non-mouse type (e.g., GUI components 301 and 305b through 305d) may be achieved by selecting a particular GUI component via the arrow key and then pressing the enter button.

Mouse type GUI component 305a may also be selected with the arrow key. For example, after selecting sub-GUI components 305d, pressing hitting a right arrow selects GUI component 305a. However, since GUI component 305a is a mouse type component, it then may be desirable to select particular regions within the GUI component itself. Thus, after a mouse type GUI component is selected, a mouse mode is activated for the selected mouse type GUT component. In mouse mode, each subsequent hit of an arrow key selects a corresponding adjacent region (or adjacent "active" region) within the mouse type GUI component. For example, after GUI component 305a is selected, a mouse cursor 311 is displayed over a first region of GUI component 305a. Each time the user hits the right arrow key, for example, the mouse arrow 311 traverses to the right within GUI component 305a. Hence, when in the mouse mode, the arrow keys control the movement of the mouse arrow 311 incrementially within the GUI component 305A.

Any suitable number of television scan lines or pixels may correspond to each arrow key selection, depending on the particular requirements of the application. For example, each selection of an arrow key may correspond to the mouse cursor moving a single scan line or pixel on the television display 205. Alternatively, each arrow key selection may correspond to several scan lines or pixels. In other words, each mouse type GUI component may have any number of regions, and each region may have include any sized portion of the GUI component. Also, each mouse type GUI component may include any number and type of active and inactive regions. For example, a GUI component may include an inactive region that displays an audio video clip, a first active region that is in the form of a slider that may be manipulated with a mouse to adjust the volume of the video clip, and a second active region that may be manipulated with a mouse to adjust the resolution of the video clip.

When the mouse cursor reaches the edge of the mouse type GUI component, in one embodiment mouse mode is disabled and another GUI component is then selected. For example, when the mouse arrow 311 reaches the left side of GUI component 305a, hitting the left arrow selects the nearest left GUI component (e.g., 305d). However, mouse mode may not be disabled if the next GUI component also handles mouse events.

In order to simulate mouse input with a keyboard or remote control for a particular GUI component, it is first determined whether the GUI component handles mouse input. In other words, it is determined whether the GUI component is a mouse or non mouse type.

For some GUI components, it may be readily apparent whether they are mouse or non mouse type. For example, the designer of the GUI component may associate a tag with the GUI component that indicates mouse or non mouse type. However, other GUI components may not have associated tags that indicate mouse or non-mouse type. In this case, the present invention operated to examine the byte code of the GUI component to determine whether the GUI component is a mouse or non mouse type.

Figure 4:
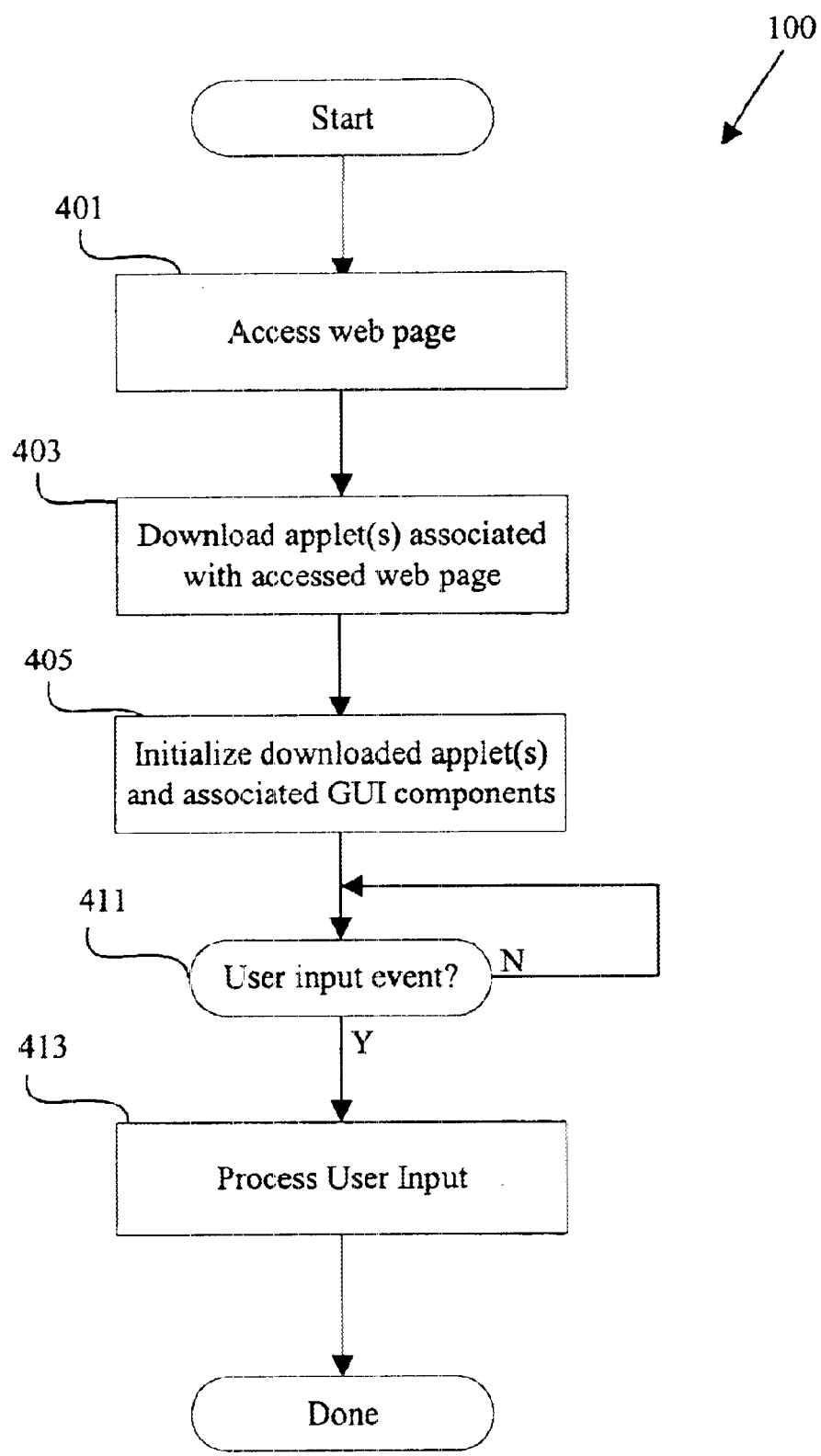
FIG. 4 is a flow chart illustrating a process for determining whether GUI components handle mouse input in accordance with one embodiment of the present invention.

FIG. 4 is a flow chart illustrating a process 100 for determining whether GUI components handle mouse input in accordance with one embodiment of the present invention. For illustration purposes, a GUI component may be in the form of an applet, or an applet may contain one or more GUI components. A set of GUI components are created when a particular web location is accessed. The set of GUI components are associated with one or more applets of the accessed web location.

Initially, a particular web page is accessed in operation 401. Any associated applets are then downloaded in operation 403. The associated applets are then initialized in operation 405. Initialization of the applets includes determining whether the associated GUI components of the applets handle mouse input, and then associating a tag with each GUI component that handles mouse input. Initialization of the applets also includes displaying and/or executing the applets and associated GUI components.

After the applets and associated GUI components are initialized, it is then determined whether there are any user input events in operation 411. In response to a user input event, the user input event is processed in operation 413. Generally, an appropriate GUI component is selected and a particular region of a GUI component is also selected if the GUI component handles mouse events. Of course, a particular region of the GUI component may also be selected with two input events (e.g., a first event selects the GUI component itself, and a second event selects a particular region). In contrast, if the selected GUI component does not handle mouse events, the GUI component itself is only selected. Input handling is explained further below in reference to FIG. 9.

Figure 5:
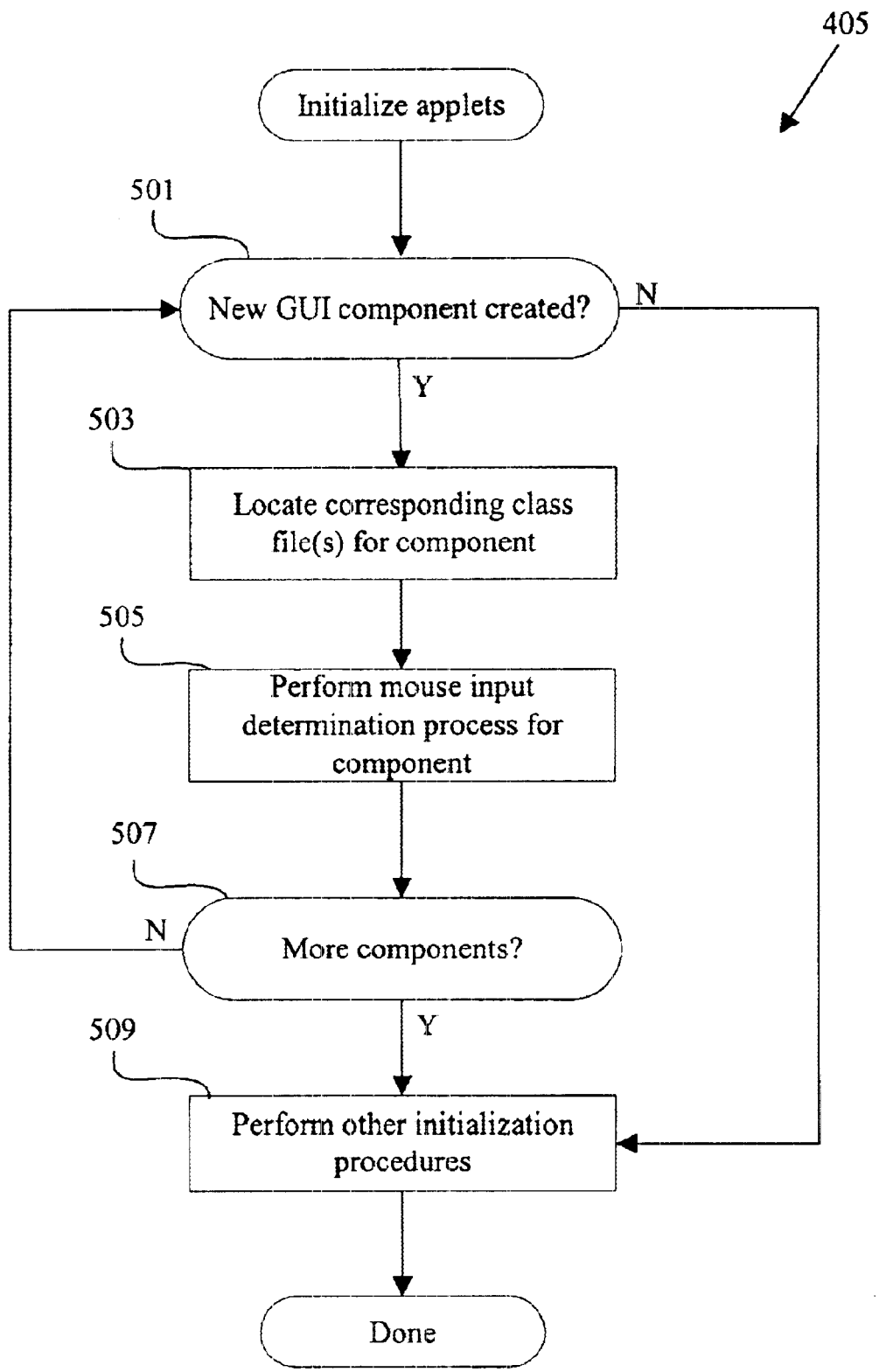
FIG. 5 is a flow chart representing the operation of FIG. 4 of initializing any downloaded applet and associated GUI components in accordance with one embodiment of the present invention.

FIG. 5 is a flow chart representing the operation 405 of FIG. 4 of initializing any downloaded applet and associated GUI components in accordance with one embodiment of the present invention. Initially, it is determined whether a new GUI component is created in operation 501. If a new GUI component is created, corresponding class files for that component are then located in operation 503.

Class files generally contain byte code that implements methods of the associated GUI component. Within the context of object-oriented programming, such as Java™ programming, a GUI component is an "object instance" of a Java™ class, and each Java class has exactly one class file. A Java™ class has one or zero super classes. For example, if a particular GUI component is an object instance of class A that has a super class B that has a super class is C that has no super class, then the particular GUI component is associated with class files A, B, and C. Each class file may contain one or more methods that are available for execution on the associated GUI component, and any of these methods may handle mouse events. In sum, mouse events may be handled within any of the class files that are associated with a particular GUI component.

After the corresponding one or more class files are located, a mouse input determination process is then performed for the new GUI component in operation 505. In general terms, it is determined whether the new GUI component processes mouse events. In other words, it is determined whether the GUI component has mouse selectable regions.

After the mouse input determination process is performed, it is determined whether any more GUI components are to be processed in operation 507. When one or more GUI components have not yet been considered, processing returns to operation 501 for processing a next GUI component. If all the GUI components have been considered, other initialization procedures are then performed in operation 509.

These other initialization procedures may include any suitable tasks for setting up a particular web page and its associated applets and associated GUI components. For example, the contents of the selected web page may be displayed, and particular applets on the page may be displayed and/or executed upon the user's local computer. The process 405 for initialing the applet then ends.

Figure 6:
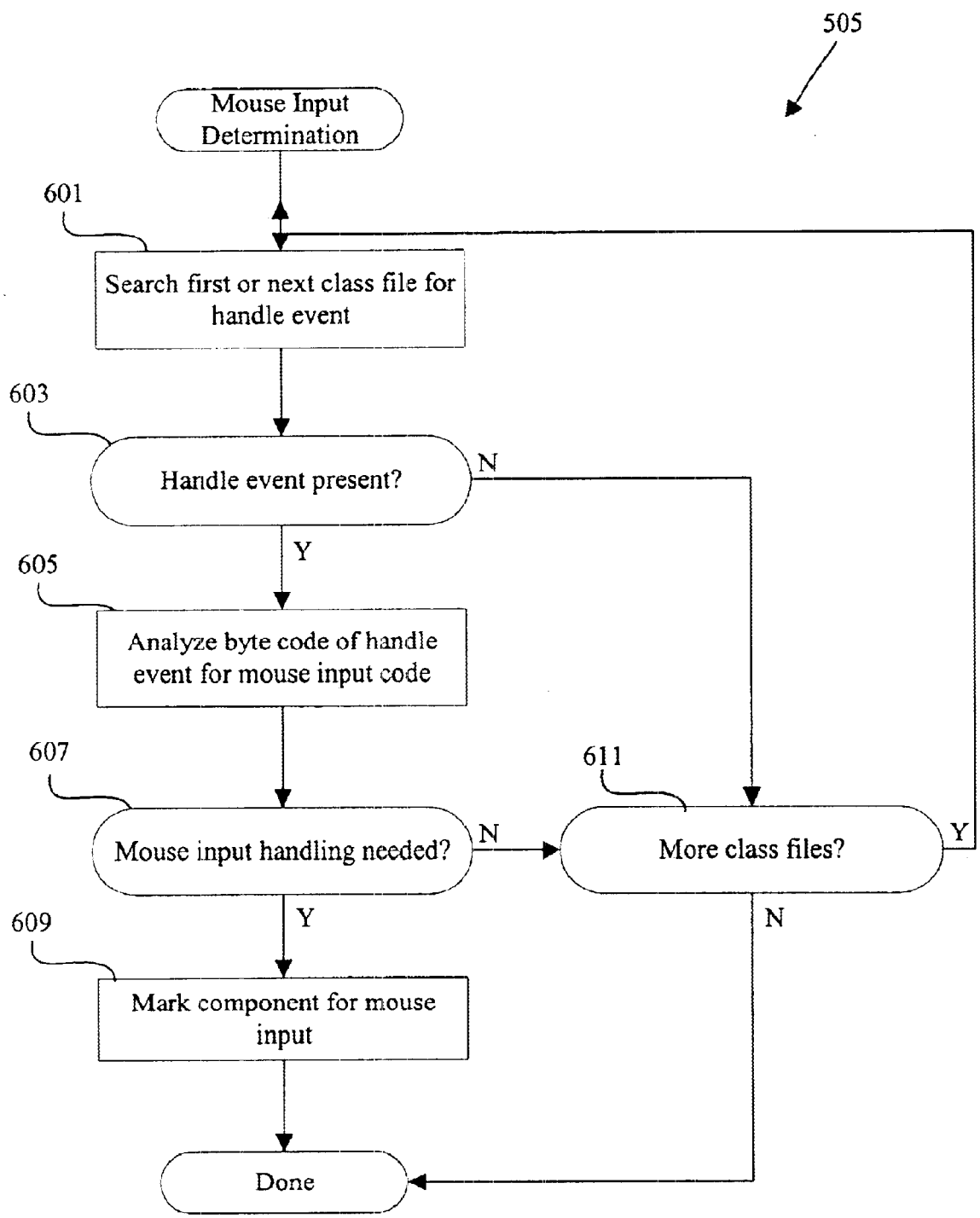
FIG. 6 is a flowchart illustrating the operation of FIG. 5 of performing the mouse input determination process in accordance with one embodiment of the present invention.

FIG. 6 is a flowchart illustrating the operation 505 of FIG. 5 of performing the mouse input determination process in accordance with one embodiment of the present invention. Initially, a first class file corresponding to the GUI component is searched for a handle event in operation 601.

It is then determined whether a handle event is present within the searched class file in operation 603. If a handle event is not present, it is then determined whether any more class files are present in operation 611. If there are more class files, a next class file is then searched for a handle event in operation 601. However, if there are no more class files, the mouse input determination process 505 ends.

If a handle event is present within the searched class file, the byte code of the handle event is analyzed for mouse input code in operation 605. The byte code may be analyzed in any suitable manner for finding mouse input code and depends on how mouse input code is formatted within the received byte code. For example, mouse input code may take the form of a block of code that compares an event value (e.g., a value from a user input device) to a known mouse event value to determine whether a mouse event is present and/or how to handle such mouse event. Thus, the block of code may be in the form of a condition statement (e.g., an "if" or "switch" statement) that performs a particular set of instructions if the event value corresponds to a known mouse event value. The code may simply use the mouse X and Y coordinates (e.g., evt.x or evt.y for Java code). Several embodiments for determining whether the byte code of a particular GUI component handles mouse events are described below in reference to FIGS. 7 and 8.

After the byte code of a handle event is analyzed in operation 605, it is then determined whether mouse input handling is required in operation 607 based on the results of operation 605. If mouse input handling is not required, it is then determined whether there are any more class files present in operation 611. If mouse handling is required, the corresponding GUI component is then marked for mouse input in operation 609 and the mouse input determination operation ends. The GUI itself may be marked or the associated class file that handles mouse events. After a class file is marked, examination of other class files for the GUI component may stop. Of course, other class files associated with the GUI component may also be examined for mouse handling. Each associated class file that contains mouse handling may then be marked. One embodiment for marking the associated class of a GUI component is described below in reference to FIG. 9.

Figure 7:
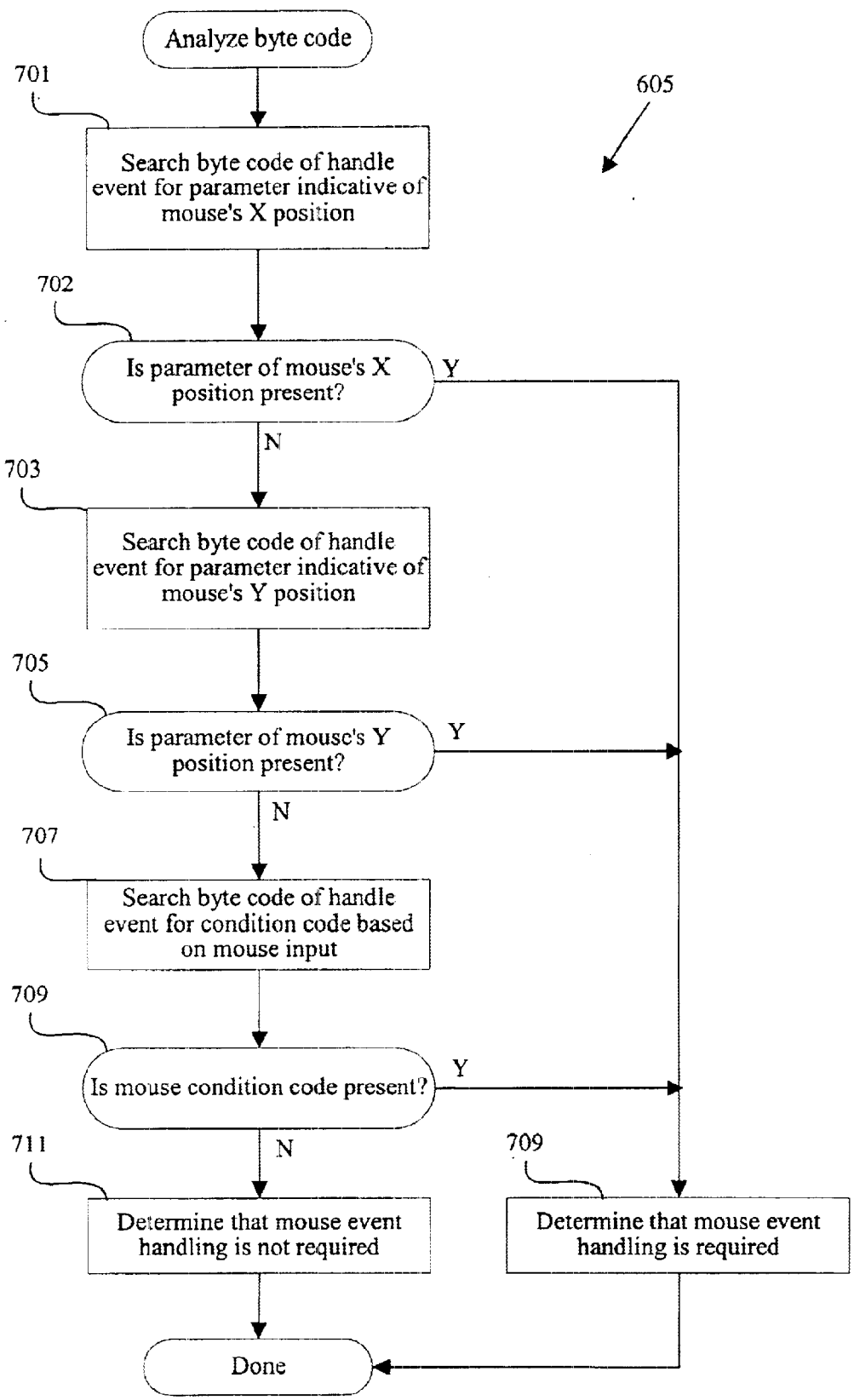
FIG. 7 is a flow chart illustrating the operation if FIG. 6 of analyzing the byte code of the handle event in accordance with one embodiment of the present invention.
Figure 8:
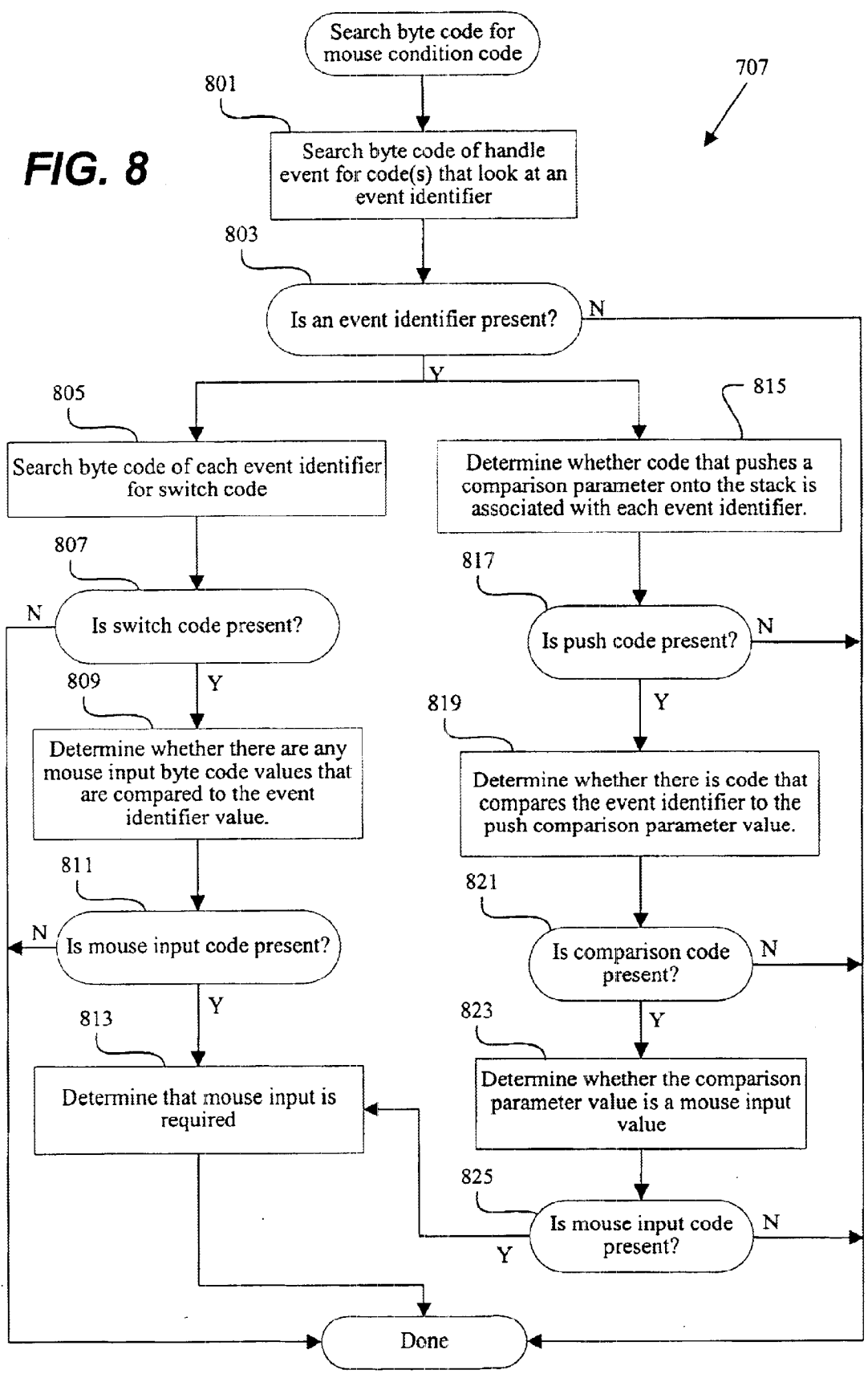
FIG. 8 is a flowchart illustrating the operation of FIG. 7 of searching the byte code for mouse condition code in accordance with one embodiment of the present invention.

FIGS. 7 and 8 are flowcharts illustrating examples of analyzing particular byte code formats in accordance with one embodiment of the present invention. In general, these flowcharts show a process for searching for five types of byte code formats: a mouse X position value, a mouse Y position value, an "if" block with mouse handling, and two "switch" type blocks with mouse event handling.

FIG. 7 is a flow chart illustrating the operation 605 if FIG. 6 of analyzing the byte code of the handle event in accordance with one embodiment of the present invention. Initially, the byte code of the handle event is searched for a parameter that is indicative of a mouse's X position in operation 701. It is then determined whether a parameter of a mouse X position is present in operation 702. If this parameter is present, it is then determined that mouse event handling is required in operation 709 and the operation 605 ends. If this parameter is not present, the byte codes are then searched for a parameter that is indicative of a mouse's Y position in operation 703. It is then determined whether a parameter a mouse's Y position is present in operation 705. Once again, if this parameter is present, it is then determined that mouse event handling is required in operation 709 and the operation 605 ends.

If the byte code processes either a mouse's Y position or X position, it is determined that the corresponding GUI components handle mouse events. Thus, it is determined that the GUI component requires mouse simulation.

If a parameter of the mouse's Y or X position is not present, the byte code of the handle event is then searched for condition code that is based on mouse input in operation 707. In this case, condition codes that are based on mouse input indicate that mouse handling is required. It is then determined whether mouse condition code is present in operation 708. If mouse condition code is present, is then determined that mouse event handling in required in 709 and the operation ends. However, if mouse condition code is not present, it is then determined that mouse handling is not required in operation 711 and the operation 605 ends.

FIG. 8 is a flowchart illustrating the operation 707 of FIG. 7 of searching the byte code for mouse condition code in accordance with one embodiment of the present invention. Initially, the byte code of the handle is searched for codes that look at an event identifier in operation 801. An event identifier generally corresponds to a particular event from input device. That is, hitting a button of a mouse device may result in a different value than hitting a button of a keyboard.

It is then determined whether an event identifier is present or has been found in operation 803. If an event identifier is present, two separate searches are performed concurrently or sequentially. The two searches provide mechanisms for locating three different types of condition blocks. Three examples are illustrated below:

(1) getfield#12, Field java.awt.Event.id I.
   lookupswitch 4: default=376
      201:370
      501:48
      502:244
(2) getfield#12, Field java.awt.Event.id I.
   tableswitch 504 to 504
      504:24
(3) getfield#12, Field java.awt.Event.id I.
   sipush 504
   if_icmpne 25

The above three code block examples will be used to illustrate the searching mechanisms described in reference to FIG. 8.

In a first search, the byte code of each event identifier is searched for switch code in operation 805. It is then determined whether switch code (e.g., above code block examples 1 or 2) is present in operation 807. If a switch code is not present, the first search ends. However, if switch code is present, it is then determined whether there are any mouse input byte code values (e.g., values 501 and 502 of example 1 and value 504 of example 2) that are compared to the event identifier value in operation 809. For a switch statement, values that are compared are on the left side of a colon (e.g., 501:48 and 502:244 of example 1; 504:24 of example 2)

It is then determined whether mouse input code is present in operation 811. If mouse input code is not present, the first search ends. However, if mouse input code is present, it is then determined that mouse input is required in operation 813 and the operation 707 of searching the byte code for mouse condition code ends.

In a second search, it is determined whether there are any codes that push a comparison parameter onto a stack (e.g., the code "sipush 504" of example 3) that is associated with each event identifier in operation 815. It is then determined whether push code is present in operation 817. If push code is not present, the second search ends. If push code is present, it is determined whether there is code that compares the event identifier to the push comparison parameter value (e.g., the code "if_icmpne") in operation 819. It is then determined whether comparison code is present in operation 821. If comparison code is not present, the second search ends.

However, if comparison code is present, it is then determined whether the comparison parameter value is a mouse input value in operation 823. It is then determined whether mouse input code is present in operation 825. In the above listed example 3, it is determined whether the byte code (i.e., "504") that is pushed onto the stack is a mouse event byte code. If mouse input code is not present, the second search ends. If mouse input code is present, however, it is then determined that mouse input is required in operation 813 and the search for mouse condition code then ends.

After the byte code of the handle events of the class files associated with a GUI component are analyzed for mouse handling code, the GUI component is then marked to indicate mouse handling. For example, a tag that indicates "mouse handling is required" is associated with the analyzed GUI component. The GUI component may be marked or tagged in any suitable manner for indicating that the GUI component requires mouse handling. For example, one or more class files of the GUI component may contain a tag that indicates mouse handling.

Figure 9:
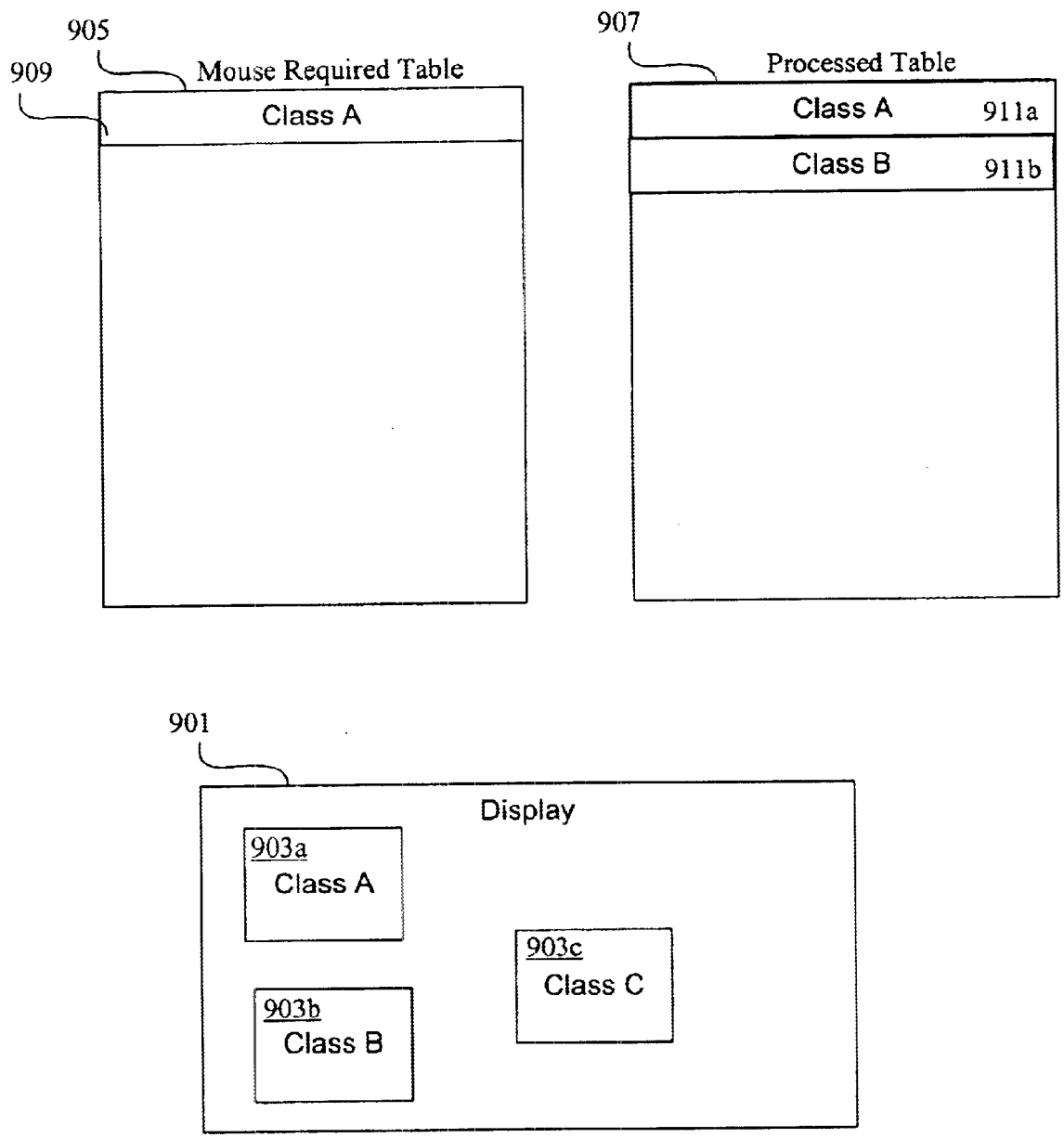
FIG. 9 is a diagrammatic representation of a mechanism for tagging a GUI component that handle mouse events in accordance with one embodiment of the present invention.

FIG. 9 is a diagrammatic representation of a mechanism for tagging a GUI component that handles mouse events in accordance with one embodiment of the present invention. As shown, three GUI components 903 are created on a display 901. After the associated class files of a GUI component are analyzed to determine whether they handle mouse events, an analyzed class file may be referenced within a "mouse required" table 905 if the class file handles mouse events. As shown, a class A reference 909 is stored in the "mouse required" table 905.

A second table may be populated as class files are processed. As shown, a "processed" table 907 contains references to classes A and B (i.e., 911a and 911b). As shown in "processed" table 907, class files A and B have been processed already, and class C has not. Thus, when GUI components 903 are created and displayed, the "processed" table may indicate whether a class file associated with a particular GUI component has been processed already. As shown, class files A, B, and C are associated with GUI components 903a, 903b, and 903c, respectively. The class files A and B of GUI components 903a and 903b have been processed already, and the class file C for GUI component 903c has not.

This configuration allows quick determination of which class files have already been processed and which processed class files handle mouse events. For example, when GUI component 903a is created, it's associated class file A has already been processed. Thus, the "processed" table 907 may be checked to determine that Class A has been processed. In the illustrated example of FIG. 9, since the processed table 907 contains a reference to class A, it has been processed.

If a class file has been processed already, the "mouse required" table 905 may then be checked to determine whether the class file handles mouse events. The "mouse required" table 905 indicates that Class A handles mouse events. On the other hand, if the "processed" table 907 contains a reference to a particular class file and the "mouse required" table 905 does not contain a reference to the same class file, it has been determined that the class file does likely not handle mouse events. As shown, the "processed" table 907 indicates that class B has been processed, and the "mouse required" table 905 indicates that class B likely does not handle mouse events.

Figure 10:
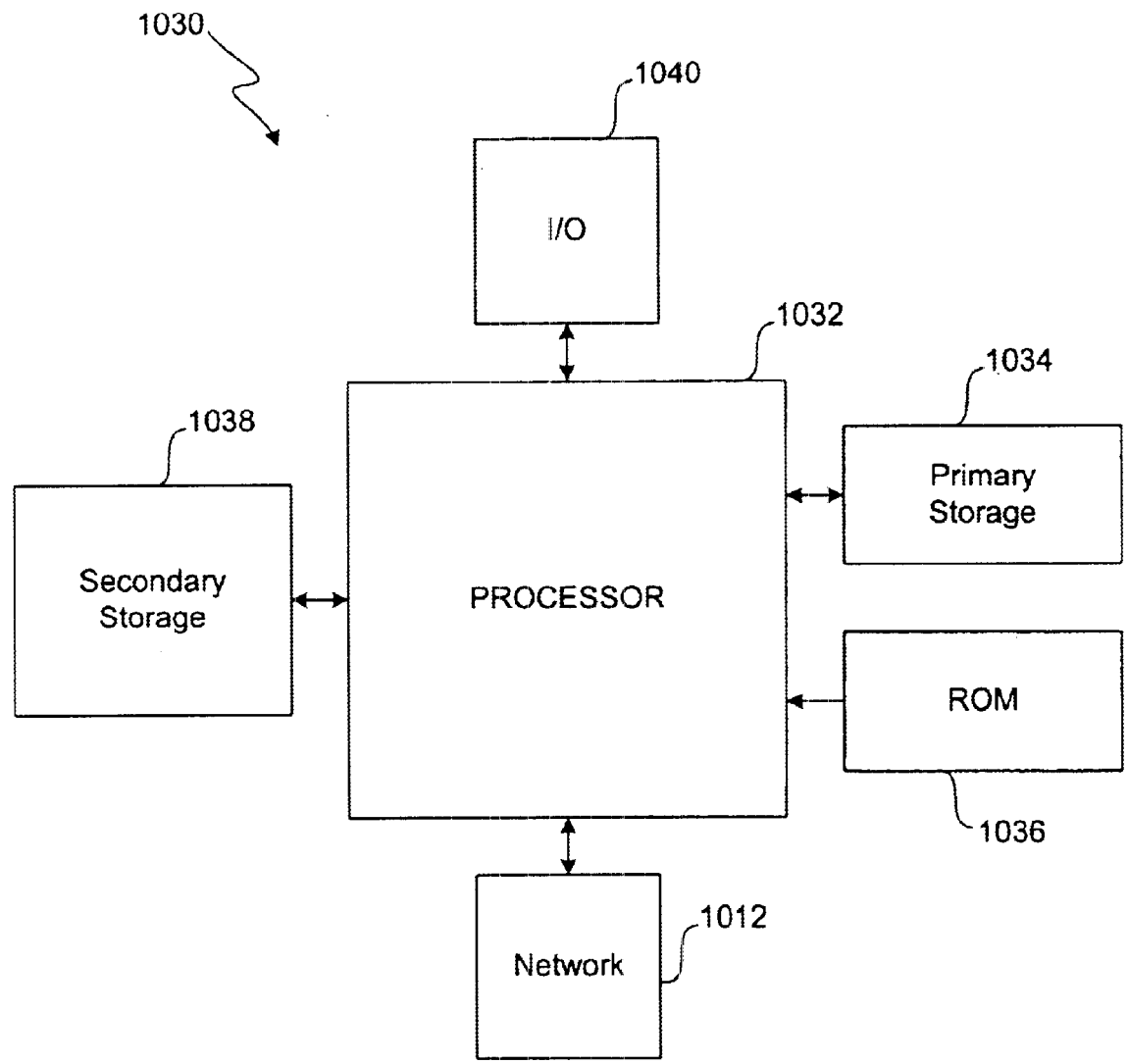
FIG. 10 is a diagrammatic representation of a general-purpose computer system suitable for implementing the present invention.

FIG. 10 illustrates a typical, general-purpose computer system suitable for implementing the present invention. The computer system 1030 includes any number of processors 1032 (also referred to as central processing units, or CPUs) that are coupled to memory devices including primary storage devices 1034 (typically a read only memory, or ROM) and primary storage devices 1036 (typically a random access memory, or RAM). The computer system may take any suitable form. For example, it may be within a set top box or integrated within an interactive television system (e.g., the television system of FIGS. 2 and 3).

Computer system 1030 or, more specifically, CPUs 1032, may be arranged to support a virtual machine, as will be appreciated by those skilled in the art. One example of a virtual machine that is supported on computer system 1030 will be described below with reference to FIG. 11. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 938 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an Internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 11:
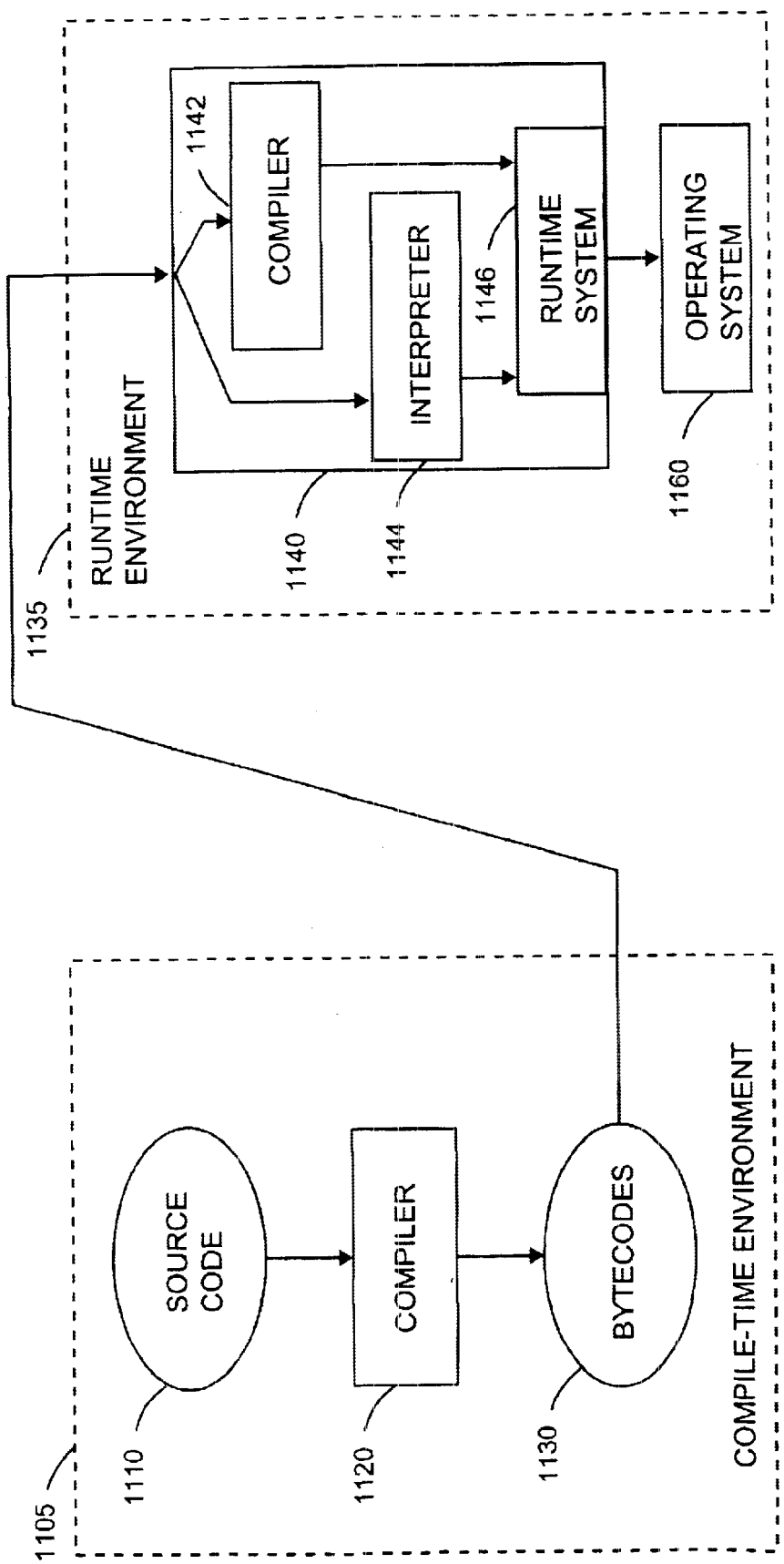
FIG. 11 is a diagrammatic representation of a virtual machine suitable for implementing the present invention.

As previously mentioned, a virtual machine may execute on computer system 1030. FIG. 11 is a diagrammatic representation of a virtual machine which is supported by computer system 1030 of FIG. 10, and is suitable for implementing the present invention. When a computer program, e.g., a computer program written in the Java (tm) programming language, is executed, source code 1110 is provided to a compiler 1120 within compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 10, or stored on a storage device such as primary storage 1034 of FIG. 10. In the described embodiment, byte codes 1130 are platform independent. That is, byte codes 1130 may be executed on substantially any computer system that is running on a suitable virtual machine 1140.

Byte codes 1130 are provided to a runtime environment 1135 which includes virtual machine 1140. Runtime environment 1135 may generally be executed using a processor or processors such as CPUs 1032 of FIG. 10. Virtual machine 1140 includes a compiler 1142, an interpreter 1144, and a runtime system 1146. Byte codes 1130 may be provided either to compiler 1142 or interpreter 1144.

When byte codes 1130 are provided to compiler 1142, methods contained in byte codes 1130 are compiled into machine instructions. In one embodiment, compiler 1142 is a just-in-time compile which delays the compilation of methods contained in byte codes 1130 until the methods are about to be executed. When byte codes 1130 are provided to interpreter 1144, byte codes 1130 are read into interpreter 1144 one byte code at a time. Interpreter 1144 then performs the operation defined by each byte code as each byte code is read into interpreter 1144. That is, interpreter 1144 "interprets" byte codes 1130, as will be appreciated by those skilled in the art. In general, interpreter 1144 processes byte codes 1130 and performs operations associated with byte codes 1130 substantially continuously.

When a method is invoked by another method, or is invoked from runtime environment 1135, if the method is interpreted, runtime system 1146 may obtain the method from runtime environment 1135 in the form of a sequence of byte codes 1130, which may be directly executed by interpreter 1144. If, on the other hand, the method which is invoked is a compiled method which has not been compiled, runtime system 1146 also obtains the method from runtime environment 1135 in the form of a sequence of byte codes 1130, then may go on to activate compiler 1142. Compiler 1142 then generates machine instructions from byte codes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X) which is incorporated herein by reference.

Although only a few embodiments of the present invention have been described, it should be understood that the present invention may be embodied in many other specific forms without departing from the spirit or the scope of the present invention. By way of example, the operations involved with determining whether a GUI component handles mouse input may be reordered and certain operations may be removed or added without departing from the spirit or the scope of the present invention.

Although mechanisms for determining whether a GUI component handles mouse input have been described as applicable to GUI components created by applets that are embedded within web pages, of course, they are also applicable for any programs that implement GUI components within a user interface. Although the methods of determining whether a GUI component handles mouse input in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

Additionally, although the present invention has been described in terms of determining whether a computer program handles mouse events, of course, other types of pointer device handling may also be determined, such as for trackball, track pad, and stylus devices. The methods and apparatus of the present invention provide ways of determining whether a GUI component likely handles pointer events and, thus, do not guarantee that the GUI component handles pointer events.

The above-described embodiments are to be considered as illustrative and not restrictive, and the invention is not to be limited to the details given herein, but may be modified within the scope and equivalents of the appended claims.

What is claimed is:

1. A computer readable medium containing computer codes for examining byte codes, the computer readable medium comprising:
   computer code for examining a byte code to determine whether the byte code is arranged to process a pointer device event;
   computer code for associating a tag with the examined byte code if it is determined that the examined byte code is arranged to process a pointer device event, wherein the tag indicates that the examined byte code requires pointer device handling; and
   computer code for executing the byte codes so as to simulate the required pointer device handling of the tagged examined byte code using an input device not specified by the byte codes.

2. A computer readable medium as recited in claim 1, wherein the examined byte code is part of a computer program that contains a plurality of other byte codes, the computer readable medium further comprising computer code for examining the other byte codes to determine whether at least one of the other byte codes is arranged to process a pointer device event.

3. A computer readable medium as recited in claim 1, wherein the examined byte code is arranged to process a pointer device event when the examined byte code has a form chosen from a group consisting of code that represents a position of a pointer device and code that compares a value of an event identifier to a known value of a pointer device event.

4. A computer readable medium as recited in claim 2, wherein the computer program is an embedded program associated with a web page.

5. A computer readable medium as recited in claim 4, wherein the computer program is downloaded when the associated web page is accessed.

6. A computer readable medium as recited in claim 1, wherein the pointer device event is selected from a group consisting of a mouse device event, a trackball device event, a track pad device event, and a stylus device event.

7. A computer readable medium as recited in claim 1, wherein the computer code for associating the tag with the examined byte code operates to provide a reference to a class file that includes the examined byte code within a pointer device table that indicates that pointer device handling is required for the class file.

8. A computer readable medium as recited in claim 7, said computer readable medium further comprising computer code for including a reference to a class file of the examined byte code in a processed table that indicates that the class file has been examined.

9. A computer-readable medium as recited in claim 1, wherein the computer codes are embodied in a carrier wave.

10. A computer readable medium as recited in claim 1, wherein execution of the byte codes causes creation of a plurality of graphical user interface (GUI) components and the simulation of the required pointer device handling of the tagged examined byte code is accomplished by:
    when a new position is selected with the input device and when a current GUI component that is currently active does not have a tag, moving to and activating a nearest GUI component or sub GUI component within the current GUI component; and
    when a GUI component that is currently active does have a tag and a new position is selected with the input device, moving to and activating a nearest region within the current GUI component.

11. A computer readable medium containing computer codes for examining a computer program having byte codes, the computer readable medium comprising:
    computer code for examining a plurality of byte codes of a plurality of GUI components to determine whether each of the GUI components is associated with a pointer device event;
    computer code for associating with each of the GUI component a tag that indicates that the GUI component responds to pointer device events if it is determined that the each GUI component is associated with a pointer device event; and
    computer code for executing the byte codes so as to simulate the required pointer device handling of the tagged examined byte code using an input device not specified by the byte codes.

12. A computer-readable medium as recited in claim 11 further comprising computer code for receiving a computer program for providing the GUI component on a display device.

13. A computer-readable medium as recited in claim 11, wherein the computer codes are embodied in a carrier wave.

14. A computer-readable medium as recited in claim 11, wherein the computer code for examining the byte codes of the GUI component operates to examine one or more class files associated with the GUI component.

15. A computer-readable medium as recited in claim 12, wherein the computer code for examining the byte codes of the GUI component operates to examine the byte codes for handling event code arranged to process pointer device events.

16. A computer-readable medium as recited in claim 15, wherein the handling event code is arranged to compare a value of an event identifier to a predetermined value of a pointer device event.

17. A computer-readable medium as recited in claim 15, wherein the handling event code is arranged to process a position coordinate of a pointer device event.

18. A computer-readable medium as recited in claim 12, wherein the computer program is an applet.

19. A computer-readable medium as recited in claim 11, wherein the computer code for examining includes determining that the GUI component is associated with a pointer device event when the GUI component's associated byte codes allow selection of a plurality of displayed regions within the GUI component.

20. A computer-readable medium as recited in claim 19, the computer code for examining includes determining that wherein the GUI component is not associated with a pointer device event when the GUI component's associated byte codes allow selection of the GUI component by selecting any displayed region of the GUI component.

21. A computer readable medium as recited in claim 11, wherein the computer code for associating with the GUI component a tag when the GUI component is determined to be associated with a pointer device event operates to provide a reference to a class file that includes the byte code within a pointer device table that indicates that pointer device handling is required for the referenced class file and any associated GUI components.

22. A computer readable medium as recited in claim 11, wherein said computer readable medium further comprises computer code for including a reference to a class file that contains the examined byte code within a processed table that indicates that the class file has been examined.

23. A computer readable medium as recited in claim 11, wherein execution of the byte codes causes creation of the plurality of graphical user interface (GUI) components and the simulation of the required pointer device handling of the tagged examined byte code is accomplished by:
  when a new position is selected with the input device and when a current GUI component that is currently active does not have a tag, moving to and activating a nearest GUI component or sub GUI component within the current GUI component; and
  when a GUI component that is currently active does have a tag and a new position is selected with the input device, moving to and activating a nearest region within the current GUI component.

24. A method for examining byte codes, the method comprising:
  examining a byte code to determine whether the byte code is arranged to process a pointer device event;
  if it is determined that the examined byte code is arranged to process a pointer device event, associating a tag with the examined byte code, wherein the tag indicates that the examined byte code requires pointer device handling; and
  executing the byte codes so as to simulate the required pointer device handling of the tagged examined byte code using an input de not specified by the byte codes.

25. A method as recited in claim 24, wherein the examined byte code is part of a computer program that contains a plurality of other byte codes, the method further comprising examining the other byte codes to determine whether at least one of the other byte codes is arranged to process a pointer device event.

26. A method as recited in claim 24, wherein the examined byte code is arranged to process a pointer device event when the examined byte code has a form chosen from a group consisting of code that represents a position of a pointer device and code that compares a value of an event identifier to a known value of a pointer device event.

27. A method as recited in claim 24, wherein associating the tag with the examined byte code includes associating a reference to a class file that includes the examined byte code within a pointer device table.

28. A method as recited in claim 24, wherein execution of the byte codes causes creation of a plurality of graphical user interface (GUI) components and the simulation of the required pointer device handling of the tagged examined byte code is accomplished by:
  when a new position is selected with the input device and when a current GUI component that is currently active does not have a tag, moving to and activating a nearest GUI component or sub GUI component within the current GUI component; and
  when a GUI component that is currently active does have a tag and a new position is selected with the input device, moving to and activating a nearest region within the current GUI component.

29. A method for examining a computer program having byte codes, said method comprising:
  examining a plurality of byte codes of a GUI component to determine whether the GUI component is associated with a pointer device event;
  associating with the GUI component a tag that indicates that the GUI component responds to pointer device events if it is determined that the GUI component is associated with a pointer device event; and
  executing the byte codes so as to simulate the required pointer device handling of the tagged examined byte code using an input device not specified by the byte codes.

30. A method as recited in claim 28, further comprising:
  receiving a computer program for providing the GUI component on a display device; and
  displaying the GUI component on the display device.

31. A method as recited in claim 29, wherein the examining of the byte codes of the GUI components operates to examine one or more class files associated with the GUI component.

32. A method as recited in claim 29, wherein the examining of the byte codes of the GUI component operates to examine the byte codes for handling event code arranged to process pointer device events.

33. A method as recited in claim 32, wherein the handling event code is arranged to compare an event identifier to a representation of a pointer device event.

34. A method as recited in claim 32, wherein the handling event code is arranged to process a position coordinate of a pointer device event.

35. A method as recited in claim 29, in the GUI component is associated with a pointer device event when its associated byte codes allow selection of a plurality of displayed regions within the GUI component.

36. A method as recited in claim 35, wherein the GUI component is not associated with a pointer device event when its associated byte codes allow selection of the GUI component by selecting any displayed region of the GUI component.

37. A method as recited in claim 29, wherein associating the tag with the GUI component comprises including a reference to a class file that includes the byte code within a pointer device table.

38. An interactive television system arranged to receive computer programs, the interactive television system comprising:

- a processing unit arranged to (i) receive a computer program having a plurality of byte codes for creating a graphical user interface (GUI) component, (ii) to examine the byte codes of the received computer program to determine whether a selected one of the byte codes is arranged to process a pointer device event, (iii) to associate a tag with the selected byte code if the selected byte code is arranged to process a pointer device event, wherein the tag indicates that the examined byte code requires pointer device handling, and (iv) to execute the byte codes so as to simulate the required pointer device handling of the tagged examined byte code using an input device not specified by the byte codes;
- an input device arranged to transmit input events to the processing unit; a display device arranged to display the GUI component created by the computer program.

39. An interactive television system as recited in claim 38, wherein examining the byte codes includes searching for byte codes that handle pointer device events.

40. An interactive television system as recited in claim 39, wherein the byte codes that handle pointer device events include code that represents a position of a pointer device or code that compares an event identifier to a pointer device event.

41. An interactive television system as recited in claim 38, wherein associating the tag with the selected byte code is accomplished by including a reference to a class file associated with the selected byte code.

42. An interactive television system as recited in claim 38, wherein the input device is selected from a group consisting of a remote control device and a keyboard device.

43. An interactive television system as recited in claim 38, wherein execution of the byte codes causes creation of a plurality of graphical user interface (GUI) components and the simulation of the required pointer device handling of the tagged examined byte code is accomplished by:

- when a new position is selected with the input device and when a current GUI component that is currently active does not have a tag, moving to and activating a nearest GUI component or sub GUI component within the current GUI component; and
- when a GUI component that is currently active does have a tag and a new position is selected with the input device, moving to and activating a nearest region within the current GUI component.

* * * * *